United States Patent [19]
Seymour

[11] Patent Number: 5,954,089
[45] Date of Patent: Sep. 21, 1999

[54] ELECTROMAGNETIC REGULATOR UTILIZING ALTERNATE VALVE OPERATING MODES FOR GAS PRESSURE REGULATION

[75] Inventor: Nathanael F. Seymour, Redondo Beach, Calif.

[73] Assignee: TRW Inc., Redondo Beach, Calif.

[21] Appl. No.: 09/061,919

[22] Filed: Apr. 17, 1998

[51] Int. Cl.$^6$ .................................................. F16K 31/02
[52] U.S. Cl. ................. 137/487.5; 137/613; 137/614.11; 137/614.13; 364/528.17; 364/528.36
[58] Field of Search ............................ 137/12, 14, 487.5, 137/486, 614.13, 613, 614.11; 364/528.17, 528.36

[56] References Cited

U.S. PATENT DOCUMENTS

| | | | |
|---|---|---|---|
| 3,516,429 | 6/1970 | Sandstede et al. | 137/12 X |
| 4,771,808 | 9/1988 | Rodger | 137/613 |
| 5,020,564 | 6/1991 | Thoman et al. | 137/487.5 X |
| 5,269,341 | 12/1993 | Nusz et al. | 137/487.5 |
| 5,677,500 | 10/1997 | Ackerley et al. | 364/528.36 X |
| 5,730,166 | 3/1998 | Ackerley et al. | 137/14 X |

*Primary Examiner*—Denise L. Ferensic
*Assistant Examiner*—Ramyar Farid
*Attorney, Agent, or Firm*—Michael S. Yatsko; Ronald M. Goldman

[57] ABSTRACT

A pair of serially connected electrically operated computer controlled gas valves combine with a pressure sensor to output pressure regulated low pressure gas dispensed from a high pressure gas source and define a pressure regulation system of relatively simple construction, great versatility and of heretofore unknown flexibility, well suited to remote control. The computer controlled valve controller selectively operates the valves in any and all of three operational modes, including the familiar Bang-Bang mode in which both valves operate simultaneously, a Bang-Wait mode in which both valves operate simultaneously for a precise time interval and thereafter close while the outlet gas pressure is checked, and a newly defined Burp mode. In the novel Burp mode, the valve closest to the high pressure gas source is first opened and closed to admit and capture a small volume of gas within inter-valve piping. Thereafter only the outlet valve is opened and closed to release that small volume of captured gas. Each small puff of gas captured and released during repetition of the cycle raises the outlet pressure ever so slightly until the desired pressure is sensed, thereby avoiding significant pressure overshoot.

20 Claims, 3 Drawing Sheets

ELECTROMAGNETIC REGULATOR UTILIZING ALTERNATE VALVE OPERATING MODES FOR GAS PRESSURE REGULATION

FIELD OF THE INVENTION

This invention relates to gas pressure regulators, and, more particularly, to an electromagnetic regulator system for accurately and reliably dispensing gas from a high pressure gas source to a low pressure gas line. The invention also relates to a new method of dispensing gas from a high pressure source in very small increments.

BACKGROUND

Many applications, such as those in spacecraft, require a supply of gas at a low pressure. That gas is supplied from a storage container or tank on board the spacecraft in which the gas is confined, compressed to very high pressures. As is known compression allows greater quantities of gas, as measured by weight, to be stored within the available volume of a given storage tank.

One application is in the spacecraft's propulsion system. Most spacecraft depend on propulsion systems to maintain and change their orbits, and to perform attitude control. In virtually all cases compressed gas is used to pressurize and expel propellant from the spacecraft's storage tanks. Ion propulsion systems require a very small gas flow and small system gas volumes are present. Low to moderate pressure gas is also used to pressurize and move liquid hydrazine to monopropellant thrusters forming the craft's propulsion system. The low to moderate pressure gas is obtained from an on-board gas tank, which stores a large quantity of the gas at very high pressure. As an example, gas for operation of a Xenon thruster is stored at 2,175 psia and is dispensed at 37 psi. To drop the gas pressure, pressure regulators are placed in the gas line between the storage tank and the low pressure application. The regulator serves to reduce the gas pressure of the dispensed gas to the low pressure desired and maintain that pressure.

A number of pressure regulator structures, including electro-mechanical types, are known, each having its particular limitations. In the past, several different kinds of pressure regulators obtained from different manufacturers were required to perform the many different active gas regulation functions onboard spacecraft built by the assignee of the present application.

Mechanical pressure regulators typically have their outlet pressure set at the factory. As a consequence other propulsion system components, such as orifices and rocket engines, must be manufactured to a very high accuracy for optimum performance, since the regulator's gas outlet pressure cannot be adjusted, either during development or in-flight. The foregoing regulators do not provide any flexibility after completion of manufacture.

A recently developed pressure regulator of simple structure used on spacecraft, that replaced more complicated regulators, consists of a simple electromagnetically operated gas valve, which either is "on" or "off". By simply opening the valve, gas is permitted to flow through that regulator from the high pressure source into the low pressure sink to replenish spent gas. When the pressure in the sink rises to the desired pressure level, as determined by a pressure sensor or pressure sensors associated with the regulator, the valve re-closes.

To ensure against valve failure in that regulator combination, a common practice is to weld two such valves in gas transmission series relationship, and operate the valves in tandem. Thus should one valve become stuck in the open condition, the remaining serially connected valve, by itself, will shut off the flow of gas. Such redundancy is obviously desirable aboard spacecraft, since a defective valve that is stuck open cannot be replaced during unmanned space flight.

A particular type of control system, one that controls a two position actuator, such as an on/off valve, is classically referred to as a "Bang-Bang" control system. For like reason, the pressure regulator in that system is known in the industry as a "Bang-Bang" regulator. This simple and reliable valve type pressure regulation system has proven cost effective and effective in performance in practice, having been successfully employed on the NASA-BMDO CLEMENTINE spacecraft on its mission to the Moon in the year 1994.

As an advantage, the present invention also employs such simple electromagnetically operated on-off gas valves as a pressure regulator to accomplish pressure regulation and incorporates such a Bang-Bang type pressure regulation mode.

Accordingly, an object of the present invention is to provide a gas pressure regulator of great flexibility, one that permits easy adjustment of the desired outlet gas pressure.

A further object of the invention is to provide a gas pressure regulator whose outlet pressure may be adjusted remotely, either by wireless transmission, data buses or otherwise.

A still further object of the invention is to avoid or minimize the necessity of using multiple gas pressure regulator designs within a given spacecraft or spacecraft product line by providing a gas pressure regulator design that is useful for regulation of pressure in essentially all gas systems found onboard spacecraft.

And an additional object of the invention is to simplify the structure and enhance the flexibility and versatility of gas pressure regulators.

SUMMARY OF THE INVENTION

Briefly, in accordance with the foregoing objects and advantages, gas pressure regulation is achieved with a pair of electrically operated gas valves that are connected in line for serial gas transmission, a pressure sensor and a programmed controller capable of selectively operating the valves independently in a number of different operating modes, suitably any or all of at least one, and preferably three, operating modes, to provide low pressure gas at an outlet from gas stored at high pressure. As an advantage, with the invention, the pressure desired for the gas outlet may be set and/or changed remotely. The controller provides multiple modes of operation for the valves and those individual modes may also be remotely set, all of which provides for a versatile and flexible bi-valve pressure regulation system.

The valve controller selectively operates the valves in the familiar "Bang-Bang" mode, in which both valves open simultaneously, and, when the desired pressure level downstream is achieved, close simultaneously; in a "Bang-Wait" mode in which both valves are opened simultaneously for a limited time interval and then are closed while the outlet pressure is rechecked, and which may be repeated as necessary until the desired outlet pressure for the mode is achieved; and in a novel "Burp" mode in which, the first valve is opened and closed to admit a small volume of gas from the high pressure source into the inter-valve piping and, thereafter, only the outlet valve is energized momentarily to release that small volume of captured gas, which procedure also may be repeated as necessary until the desired pressure is sensed.

The new sequencing of the operation of the two valves to express a small volume of gas, a puff, so to speak, that lifts the outlet pressure ever so slightly, characteristic of the Burp mode, enables the outlet pressure to be finely regulated, if desired.

In accordance with an additional feature, the valve controller is "computerized" and operates the valves in accordance with a stored program, an algorithm, to accomplish the desired pressure regulation. In alternative embodiments the controller may be a stand-alone component or a "virtual" component that is resident as a software program on another computer that is also responsible for controlling other equipment and/or processes as well as the foregoing pressure regulation process.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE PREFERRED EMBODIMENTS

Figure 1:
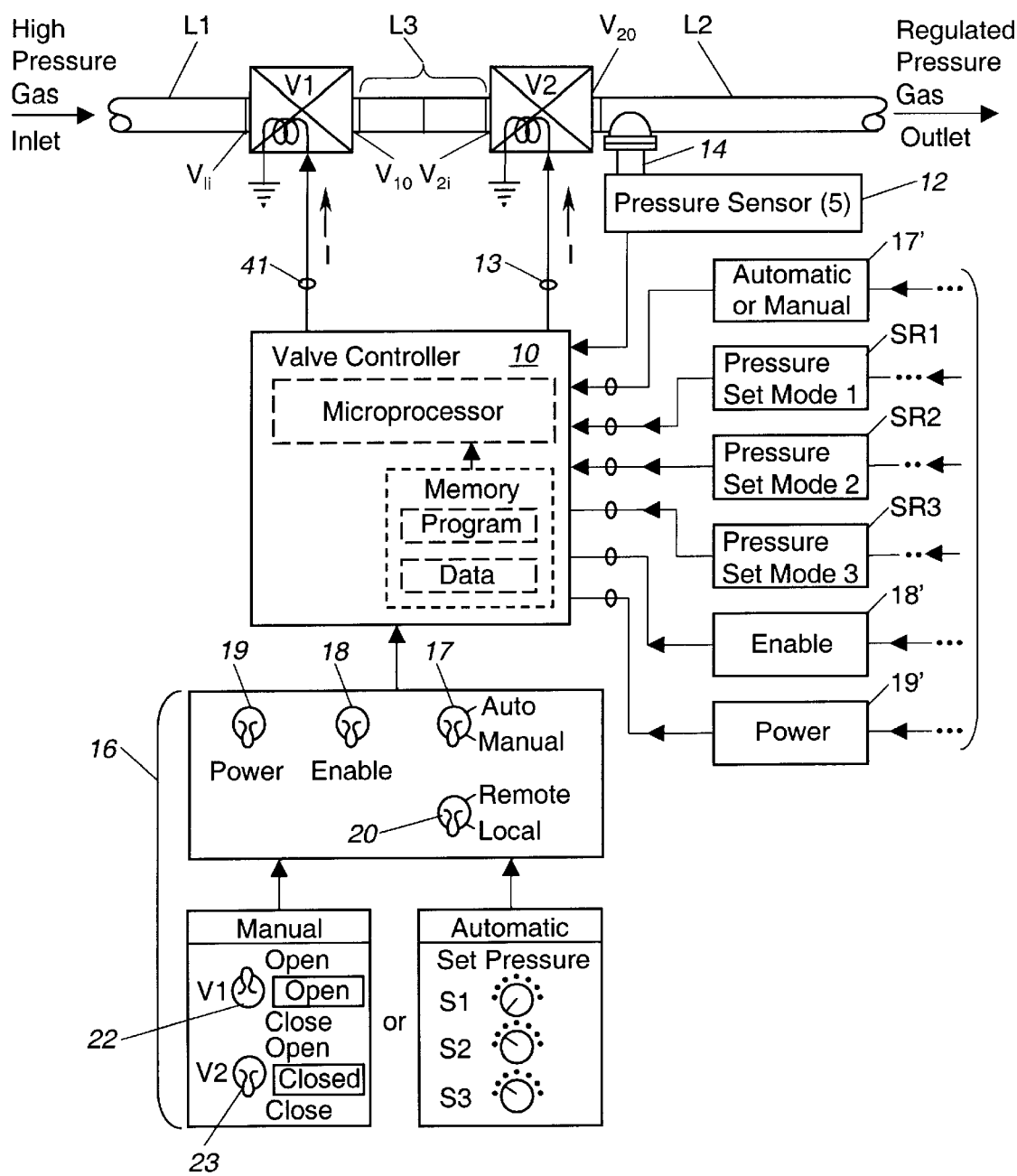
FIG. 1 is a block diagram of an embodiment of the invention.

Reference is made to FIG. 1, which schematically illustrates an embodiment of the invention. In this, two substantially identical electromagnetically operated gas valves V1 and V2 are connected in series for gas transmission between a high pressure gas conduit or line L1 and a low pressure gas conduit or line L2. A valve controller 10, is included for controlling operation of those valves, individually.

In application, the inlet end of the gas line L1 connects to a source of high pressure gas, not illustrated, such as a gas tank which serves as a reservoir for large quantities of gas, that is dispensed, as needed, and at a specified or regulated pressure level. To conserve space, the stored gas is compressed into a relatively small volume and, hence, is maintained at a very high pressure. In spacecraft systems, as example, the stored gas pressure is on the order of 4,500 psi. The gas pressure at the outlet is lower, on the order of thirty psi to four-hundred psi.

The outlet end of the gas line L2 connects to the utilization apparatus, such as a monopropellant thruster propellant tank, not illustrated, which intermittently consumes gas supplied at low pressure. As the low pressure gas lines and associated apparatus are unable to withstand application of high pressure gas, dispensing of the high pressure gas from storage must be accomplished with pressure regulation, ensuring that the gas introduced into the low pressure gas line does not materially exceed a low pressure design maximum. The dual valve arrangement regulates that pressure.

The electromagnetic gas valves V1 and V2 are of any conventional structure, such as those containing a solenoid coil, represented in dash lines, that, when energized by electrical current, moves a valve member, biased closed, to open a gas passage and maintains that open passage only for so long as the solenoid coil remains energized. Valves of this type are available, as example, from the ValveTech Company of Phelps, N.Y. Valve V1's inlet V1i is connected to the outlet end of gas line L1. Its outlet V1o is connected to the inlet V2i of the second Valve V2, suitably by a short length of gas line L3 between the valves. That provides an inter-valve region. In alternative embodiments, the outlet of Valve V1 may be connected directly to the inlet of Valve V2, such as by welding the respective valve's end flanges together, to define an even smaller inter-valve region between the two valves, one that is even more limited in volume. The outlet V2o of valve V2 connects to the gas outlet line L2. The foregoing circuit connects both valves in a series gas transmission circuit.

Valve controller 10, represented in block form, contains the power circuits for energizing the valves by supply of electrical current to outputs 11 and 13 and contains the control circuits for valve selection, operation and duration. The controller may contain a selection panel 16, which contains a number of manually operated switches for the operator, including selection switch 17, a two position switch for selecting manual or automatic operation, a power switch 19, an enable switch 18, pressure setting switches S1, S2 and S3. The panel also contains a remote switch 20, actuation of which transfers control from the panel to remote control operation, later herein described, illustrated by the data lines on the right in the figure.

The power and enable switches, 19 and 18, are conventional on-off switches. When power switch 19 is set to the "on" position, electrical power from a source, not illustrated, is supplied to the controller. With electrical power supplied, the controller stands by idle until enable switch 18 is operated. Once operated, the valve controller commences running the selected valve operating program or operating the valves manually, depending upon switch 17 being placed in the automatic or manual position, respectively, whichever the user desires.

Toggle switches 22 and 24 are "on-off" switches that control energization of valves V1 and V2, respectively, allowing the user to individually operate the respective valves, when selection switch 17 is set to the manual position. This allows the user to manually test each valve, among other operations.

The pressure setting switches S1, S2 and S3 output a numeric input to the controller in automatic operation, identifying the particular pressure levels desired to internal circuits within the controller. By variation of the position of the three switches, S1, S2 and S3, the controller can be set to operate the valves in any of the three automatic forms, mode 1, mode 2, mode 3, the respective Bang-Bang, Bang-Wait and Burp modes earlier briefly described, or any combination of those modes. The manner in which that is accomplished is described in detail later herein. Switch S1 sets the cut-off pressure or, as variously termed, the pressure limit desired for mode 1, switch S2 is used to set the pressure limit desired for mode 2, and switch S3 is used to set the pressure limit desired for mode 3.

As an alternative to a selection panel, the aforementioned control panel switches settings may be set at a remote panel or computer and supplied to the valve controller via data and power lines to appropriate valve controller inputs, as symbolically represented in the figure in blocks labeled "automatic or manual" select 17', pressure set SR1, pressure set SR2, pressure set SR3, enable 18' and power 19'. Although the control panel illustrated permits one to more easily understand the operation of the invention, this inputting of the data supplied from a remote source is the preferred form of implementation for the invention. Transfer of control to remote operation is accomplished by operating the two-position selection switch 20 to the "remote" position.

With the power switch 19 operated and supplying the controller with appropriate operating power and switch 17 set to automatic, the pressure regulating system is in a standby mode. The operator sets the pressures on switches S1, S2 and S3. Thereupon the operator operates enable switch 18, which is recognized by the valve controller, and the valve controller commences selective operation of the valves in accordance with the mode selection made and the pressure levels selected on S1, S2 and S3.

In operation, both valves V1 and V2 are normally biased closed, preventing passage of gas through lines L1 and L2. They open to permit gas passage when the respective electromagnetic coils or solenoids, as variously termed, represented in dotted outline, are energized through application of DC current, supplied from valve controller 10, at outputs 11 and 13, to the respective solenoid inputs. When such current is supplied, the current flows through the solenoid to electrical ground potential, represented in the drawing by the ground symbol, thereby generating the magnetic field in the solenoid to operate and open the respective valve. The input of pressure sensor 12, as represented by the coupling 14, connects to the outlet V2o of valve V2 and measures gas pressure in that region. The pressure sensor supplies its output to an input of valve controller 10, supplying pressure level information, suitably, in digital form.

Pressure sensor 12 is preferably formed of three separate sensors, not separately illustrated, that monitor gas pressure at the same location along conduit L2. The multiple sensors provide a desirable redundancy. Hence, the valve controller's input for those sensors is actually three separate inputs. In normal circumstances, the pressure information provided by each of the three sensors should be the same, which is assumed for the present. As later herein described, should the readings differ, such as in the event of a sensor failure, the controller is able to distinguish that event and eliminate the non-working sensor's pressure information.

In the first or Bang-Bang mode of operation, valve controller 10 supplies energizing current to both valves V1 and V2 simultaneously, energizing the respective solenoids, which opens those valves and allowing gas to pass through. Gas propagates at high velocity from gas line L1 through the open valves to outlet gas line L2. Concurrently, the valve controller is receiving the pressure information from pressure sensor 12. When the pressure at the outlet V2o attains the set level, set by S1, the valve controller terminates the solenoid energizing current and the two valves deenergize and close, cutting off further supply of gas to gas line L2.

In the second or Bang-Wait mode the controller supplies electrical current simultaneously to both valves for an interval, about 40 milliseconds, as example, and. then terminates that current, thereby opening and then closing both valves simultaneously. The controller then waits and determines if the pressure sensed at the outlet V2o of valve V2 has attained the desired level, the level set by S2. If not, the controller repeats the described valve action and waits, repeating the process until the set pressure is attained. When the desired pressure level has been attained, the valves remain closed.

In the third or Burp mode, controller 10 first energizes and then deenergizes valves V1 and V2 in sequence. When V1 operates, while V2 is closed, a small quantity of high pressure gas is admitted into the inter-valve region, the region represented by line L3 in the figure. When valve V1 closes that gas is essentially captured within the region. When valve V2 then opens, that small volume of gas is expressed through the outlet V2o and into the outlet gas line L2. Essentially the foregoing valve sequencing action admits a limited amount of gas into gas line L2, a short burst, puff or burp of gas, during each such operational cycle of the two valves.

Following that puff of gas, valve controller 10 then determines whether the pressure in outlet gas line L2, and, hence, at the outlet of Valve V2, attained the desired level, which is that set at selector switch S3. If not, the controller repeats the described Burp action. The controller repeats that action until the set pressure is attained. When the pressure level is attained, both valves remain closed.

In an elemental, but not preferred form of the invention, any of the three modes may be individually selected for use to regulate valve outlet pressure. Since that embodiment is less preferred, however, it is described later in this specification, following the preferred embodiment. In the preferred embodiment, the controller operates consecutively in each of the modes to attain the desired outlet pressure level. That is, the controller should start in mode 1, then proceed to mode 2 end finish with mode 3. This is accomplished by setting the pressure levels for modes 2 and 1 to consecutively smaller pressure levels than the final pressure level desired at the conclusion of mode 3. In that event, the controller operates in mode 1 until the first pressure level is attained, then operates in mode 2 until the next pressure level is attained and finishes with mode 3 to the desired pressure level.

The foregoing controller operation is elementary in nature and may be implemented by many types of Known analog or digital logic circuits. However, the preferred form for the valve controller is a programmed digital computer, such as a programmed semiconductor microprocessor and associated semiconductor memory, including EPROM type or other semiconductor memory.

For stand-alone operation, the valve controller 10 is a separate computerized apparatus. However, alternatively, where gas valves V1 and V2 are part of an overall system that is controlled by a computer, then, as those skilled in the art recognize, valve controller 10 may be a "virtual" unit. That is, the controller may be incorporated within the main computer simply as a software program. The latter embodiment is useful for space vehicle application, since the space vehicle contains computers of large capacity which control all operations on the space vehicle. The former embodiment is preferred since it is useful across all spacecraft, regardless of onboard processing capability and speed.

Data entry to the valve controller may be made over one or more data lines, such as represented in connection with elements 17', 18', SR1, SR2 and SR3, and electrical power may be supplied remotely over a power line such as represented in connection with element 19'. The three pressure settings may be entered manually by an analogue to digital selector switch, one which converts the angular position of the selector switch to a digital output code, of digital highs and lows or ones and zeros as variously termed. A like selector switch is provided for each of the three modes of operation included in the foregoing embodiment.

In the controller's computer, selected inputted data by design is stored on EPROM type semiconductor memory. Such EPROMS are a kind of semiconductor read only memory (ROM) device, which stores digital information in a non-volatile manner, that is, essentially permanent, but, which can be erased and replaced by substitute information. When running the valve pressure regulating branch program, the main computer thus is designed to poll information in certain locations in memory into which the pressure setting information is deposited or inserted, initially at the manufacturer, or later. Through a conventional "back door" designed into the computer, via radio transmission from a ground location, the digital data in the selected E-PROM locations may be changed and new digital data containing the new pressure settings may be inserted.

That digital code supplies the pressure setting information on a parallel data line, SR1, SR2 and SR3, connected to pressure select inputs of the controller. During the operation of the controller's stored program, the internal computer processor checks all those inputs and copies that information into the processor's associated memory or registers for later use during the running of the pressure regulation program.

Alternatively, depending upon the particular details of a specific program design, the pressure setting data can be supplied to the computer as serial digital data, a data packet, containing the three pressure settings in sequential order. During the course of the program, the computer can initiate reading of the input data, and separate the data packet into three different memory locations, one for each mode of operation used with the foregoing embodiment.

Valve controller 10 contains a pressure input setting for each operating mode, represented by selector switches S1, S2 and S3, respectively. The system operator individually specifies the pressure level desired for each mode S1, S2 and S3 and those choices are provided to the controller input in digital form. The foregoing embodiment as illustrated supplies the information in parallel. Other known circuit arrangements may be used for entering that information into the computer in serial order. The information may be selected manually by selector switches or may be selected in any other conventional manner consistent with the design of the particular processor employed in the controller. Preferably, the information is supplied from a remote location.

The valve arrangement is able to function in a multiplicity of modes. In one mode of operation, referred to as the "Bang-Bang" mode, the controller energizes both valves simultaneously until the pressure at the outlet is at or above a predetermined value, which, because of the pressure differential driving the gas flow at high velocity, is accomplished in a limited interval of time. With the gas achieving the desired pressure at the outlet as measured by pressure sensor 12, both valves are then de-energized by controller 10 and close, shutting off the gas flow. In this mode, gas from the high pressure end passes directly through both valves to the gas outlet. This mode of operation provides the same function as the prior art regulating system in which serially connected dual valves, provided for redundancy protection in the gas system, are always operated simultaneously, providing protection should one valve become mechanically stuck in the open condition.

In the second mode of operation, referred to as the "Bang-Wait" mode, the controller energizes both valves V1 and V2 simultaneously, which results in opening both valves, and after a set amount of time deenergizes them both, admitting a pulse of the high gas momentarily to the outlet, and then awaits a new pressure reading from pressure sensor 12. Should the pressure sensed during that idle interval remain too low, the controller repeats the procedure, halting the procedure only when the pressure sensed at the outlet achieves a desired level.

The valve is open for a predetermined amount of time that is on the order of the valve's release time, the duration between the time energizing current is removed from the valve input and the time the valve actually closes.

In the third mode of operation, referred to as the "Burp" mode, the controller energizes only valve V2. In the latter mode, any gas retained or captured in the limited volume between the two valves, which is at a higher pressure than the pressure at the outlet, is released from the outlet end of line L. This is referred to as burping the valve. The gas may be captured in the inter-valve piping as a consequence of operating the valves in the Bang-Bang mode, when both valves closed simultaneously. Alternatively, the gas may be captured by deliberately momentarily operating valve V1, opening the valve and then closing it, to admit and capture a small amount of gas in the inter-valve region. The foregoing technique of regulating outlet gas pressure carried out by the Burp mode is an important aspect to the invention and is believed to define a new method of accomplishing pressure regulation.

Pressure sensor 12 is quick acting, more quick acting than the valves. It senses pressure changes almost instantaneouly, on the order of one millisecond or less. Valves V1 and V2 when energized open fully in about 25 milliseconds. When deenergized, the valves close in about 35 milliseconds. Valves of the foregoing type are available from commercial sources, as example, from the ValveTech Company of Phelps, N.Y.

The controller can be set to run the three modes in sequential order, providing the pressure settings are of the following relationship S1<S2<S3. In that event, following the operation of mode 1 as earlier described, the Bang-Bang mode, the controller then proceeds to run the second mode, the Bang-Wait mode, as earlier described. Upon the conclusion of the Bang-Wait mode when the pressure sensed exceeds S2, the controller, then runs the third mode, the Burp mode, which continues until the pressure sensed is at or above S3.

The Bang-Bang mode may be likened to a bulk transfer, quickly transferring a large amount, that may significantly overshoot the mark. The Bang-Wait mode transfers a more limited amount than the former, but also could result in some overshoot. The small increments of gas transferred in the Burp mode lends itself to more precise pressure control. By using the three modes in sequential order as just described, it is possible to precisely attain the final pressure S3 in the fastest possible time, without material pressure overshoot.

Figure 2:
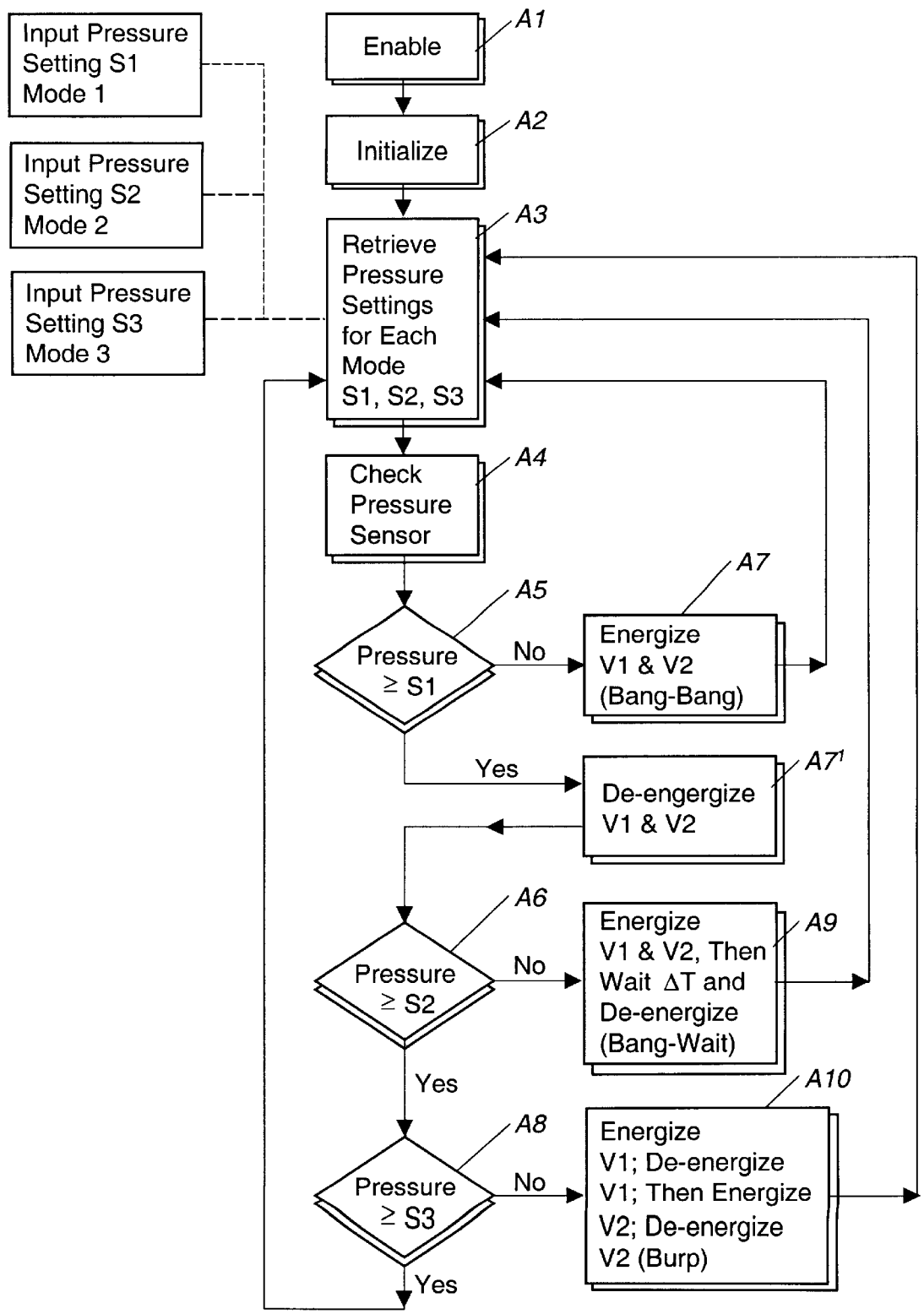
FIG. 2 is a flow chart of the operation of the controller used in the embodiment of FIG. 1.

The flow chart of FIG. 2 presents the algorithm implemented by the controller during the last described operation. The pressure levels used as the cutoff or maximum for the three individual modes are set by the operator and are presented to the controller inputs as digital information, represented by blocks S1, S2 and S3. In this embodiment those inputs are supplied as digital logic and the controller includes an input for each.

With electrical power supplied to the controller and an enable signal sent by the operator or system, which is input to the controller, as represented at block A1, the processor becomes active, initializes its internal registers, as represented at block A2, and commences to run the program, retrieving the pressure settings for each of the three modes, S1, S2 and S3, as represented at block A3.

As represented at block A4, the controller then checks the pressure information supplied by pressure sensor 12 (FIG. 1), the actual pressure at the outlet of valve V2. The pressure information is then compared with the pressure setting for S1, as represented at decisional block A5, and, if that pressure exceeds that pressure level, proceeds to decisional block A6, represented by the YES, to make another pressure comparison. Assuming the decision, however, is negative, the controller initiates the Bang-Bang mode, S1, operation represented at operational block A7.

The controller energizes both valves V1 and V2, which open and allow passage of gas from the reservoir to the outlet. With the valves open, the controller proceeds to again check pressure sensor 12, and recycles through the foregoing operation, leaving the valves energized until the pressure attains or exceeds the level set at S1. When the pressure equals or exceeds S1, the decision at block A5 is affirmative, the controller deenergizes both valves, as represented at operational block A7', and those valves now close, and the controller tests the last measured pressure to determine if that pressure exceeds the level S2 set for the Bang-Wait mode, as represented at decisional block A6.

If the decision at block A6 is affirmative, as represented by the YES, the controller then steps to an additional comparison of that pressure, as represented at decisional block A8. Assuming, however, that the decision at block A6 is negative, the controller initiates the Bang-Wait mode of operation as represented at operational block A9.

In the Bang-Wait mode of operation, valves V1 and V2 are both momentarily energized and then, after a predetermined interval, is de-energized, allowing the valves to open and then close. That action admits a large pulse of gas from the reservoir to the gas outlet. Typically, in a practical embodiment the two gas valves V1 and V2 have operate and release times of about twenty milliseconds each, allowing the gas to propagate for about forty milliseconds per cycle of this mode. Following that action, the controller rechecks the pressure settings, as represented at block A3, and the measured pressure as at operational block A4.

At this stage, the controller runs the test at decisional block A5, and, based upon the foregoing assumptions, the measured pressure remains above S1, and proceeds to test the pressure again at decisional block A6. If the outlet pressure measure has not yet equaled or exceeded S2, a negative decision is again made and the Bang-Wait mode of operational block A9 is repeated.

However, assuming that the decision at block A6 is affirmative, the controller then checks the pressure information against the level S3 set for the third mode, referred to as the Burp mode, as represented at decisional block A8. If the measured pressure does not exceed S3, the decision is negative and the controller proceeds to operational block A10, wherein the Burp mode is run.

As earlier described in connection with FIG. 1, when both valves were simultaneously closed, as occurred during operation of either of the two preceeding modes, a small amount of gas is retained in the conduit L3 between the two valves when the valves were simultaneously closed. By opening and closing only valve V1, a small amount of gas is admitted into that region. Because valve V2 remains closed, that admitted gas is retained in the inter-valve region when Valve V1 re-closes.

In the Burp mode, as represented at operational block A10, Valve V1 is momentarily energized and opens for a brief interval, and then recloses, capturing the small amount of gas. Next Valve V2 is momentarily energized and opens for a brief interval and then recloses. During the brief interval in which valve V2 is open, the valve allows the captured gas, which is at a higher pressure than the gas at the outlet, to exit through the outlet. A small puff of gas is passed. Following that sequence of action, the controller rechecks the pressure settings at S1, S2 and S3, as at block A3 and the pressure sensor as represented at block A4.

The pressure checks are again made through blocks A5 and A6 and again at A8. If the pressure remains below S3, the setting for the Burp mode, the operation at block A10 is repeated, admitting another puff of gas. Because very small amounts of gas are transported to the outlet during each cycle of the Burp mode, effectively, the Burp mode allows the gas pressure at the gas outlet to be "fine-tuned".

Once the decision at block A8 is affirmative, both valves V1 and V2 remain deenergized, and the controller rechecks the settings at S1, S2 and S3 and the outlet pressure. As long as the outlet pressure remains above S3, further valve operation does not occur, and the controller continues to repeatedly make pressure checks.

The foregoing system allows one to effectively omit one or more modes of operation if desired by simple adjustment of setting the pressure levels. As example, to exclude the Burp and Bang-Wait modes of operation in the valve system, all that it is necessary to do is set pressure levels S2 and S3 to a low pressure, such as zero. As a more specific example, if 100 psi is the desired outlet pressure level, and the system operator only wishes to use the Bang-Bang mode, the operator sets switch S1 to 100 psi and switches S2 and S3 to zero psi.

Referring again to the flow chart of FIG. 2, it is seen that once the Bang-Bang mode operation is completed, the additional pressure checks at decisional blocks A5 and A8 will also be affirmative, effectively by-passing the operations of operational blocks A9 and A10, covering the Bang-Wait and Burp modes.

Alternatively, one is able to employ only the Burp mode of operation, excluding the other operational modes, as example when the system calls for accurate fine tuned pressure level at the system outlet with no chance of pressure overshoot. This is accomplished by setting the pressure levels for the Bang-Bang and Bang-Wait modes, S1 and S2, to a very low level, such as zero psi, a pressure below that residual pressure level normally found at the outlet, and setting the pressure level for the Burp mode S3 to the desired level.

As a more specific example of the latter, S1 and S2 are each set to zero psi, and S3 is set at 100 psi, and the residual pressure at the gas outlet V2o in FIG. 1 will always be greater than 50 psi. Referring again to the flow chart of FIG. 2, it is seen that the pressure checks at decisional blocks A5 and A6 will always be affirmative, resulting in bypassing the operations of blocks A7 and A9, the Bang-Bang and Bang-Wait modes. Only the pressure check at. decisional block A8 will be effective, and result in operation of the Burp mode, continuously, as previously described, until the decision at block A10 is affirmative. In like manner, by setting S1 and S3 to zero and S2 to the desired pressure, it is seen that only the Bang-Wait mode is effective to control the gas pressure.

It is seen that the judicious selection of pressure settings for S1, S2 and S3 allows one to permit the controller to implement a selected one or more of the three modes, and effectively disable operation those operating modes that were not selected. In that way the need for a multi-position selector switch to select any one or more modes or combination of modes for operation is not necessary.

The foregoing algorithm and accompanying description specifies the program in general terms as may be applied to any available computer chip and its associated operating system. It is appreciated that, given the described requirements and operation of the system as herein presented, any programmer of ordinary skill is capable of selecting an available computer chip, microprocessor, and defining one or more specific software programs that will carry out the prescribed functions using the selected computer chip.

To test or check operation of the valves during manufacture or to demonstrate operation or even as one specific practical embodiment of a valve controller for the valves, the valve controller can be emulated by a desktop computer having the appropriate IEEE outputs for controlling the valves. A software program LabView Instrumentation Software marketed by the National Instruments company of Austin, Tex. can be used for this purpose. The Labview environment allows the execution of specific computer code written to support operation of the aforementioned electronic regulator. The computer code to satisfy the described regulator requirements and implement the algorithms given are not necessary to an understanding of the present invention and may be accomplished by a programmer or other person skilled in the art without undue experimentation. To avoid burdening the present specification with unnecessary detail those program details are thus not included.

The Labview program generates icons for each of the three different pressure settings. To enter that data, one simply moves the computer mouse and "clicks" on the icon for mode 1 and then enters via the computer's keyboard the pressure setting numbers desired for mode 1, and repeating those steps for each of the two additional icons for the additional valve modes. To start the operation and run the valve operation one merely "clicks" on the "enable" icon and the computer initiates operation.

A significant advantage of the foregoing pressure regulating system is that the mode of operation, hence, the regulated outlet pressure can be adjusted by remote control. Consider the system as being in use on board a spacecraft and with the valve controller implemented as a "virtual" controller on the spacecraft's main computer. That main computer's inputs are linked via radio transmission to control stations located on the Earth. Thus through commands from the earth station, data and/or settings of the main computer can be remotely changed.

The foregoing invention provides for a versatile pressure regulator structure, one that is infinitely more versatile than the valve type pressure regulators of the prior art. One need only change a set of values and selectively operate in any one or more modes. No changes of structure are necessary to vary the outlet pressure or mode of operation.

Reference is again made to pressure sensor 12, illustrated in FIG. 1. Although for simplicity, the sensor is illustrated as a single block, the pressure sensor in the preferred embodiment in practice constitutes a series of individual pressure sensors, as example three, which are connected to monitor outlet gas pressure at the same axial location in conduit L2 relative to the end of outlet V2o. In making reference to monitoring outlet gas pressure, it is understood that in this invention the foregoing term includes within its meaning the monitoring the gas pressure at different displacements from that outlet end within conduit L2. And, although only one input is illustrated in FIG. 1 to the controller, that one input represents three individual inputs. Being connected at essentially the same outlet position, provides a built-in redundancy to the pressure measurement.

With multiple pressure sensors, one anticipates that the pressures measured by each may differ somewhat. When multiple pressure sensors are employed in the system, the valve controller includes a subsidiary program to receive and interpret pressure readings from each of the sensors and provide a gas outlet pressure, an "interpreted" gas outlet pressure. The pressure data from three sensors is processed by controller 10 to provide the best estimate for the true pressure. The program discards obviously incorrect pressures, such as a pressure reading that is less than zero psi or a pressure reading that exceeds the pressure limit for the storage tank, as might occur should one or more sensors fail, and uses the pressure information supplied by the remaining sensors.

Additionally, with three working pressure transducers, the readings obtained from the two transducers closest in value may be averaged and that average supplied as the interpreted gas outlet pressure that is used by the valve control program as earlier described. Should there be only two working transducers, the readings are averaged and, again that average pressure is supplied as the interpreted gas outlet pressure that is used by the valve control program. And with one working transducer, the pressure reading is used "as is" and is the interpreted gas outlet pressure. The foregoing processing is subsumed in the operational step at block A4 in FIG. 2, when the pressure sensor 12 is to be checked, and the interpreted gas outlet pressure is the pressure information that is used.

It is appreciated that the foregoing subsidiary program is rudimentary in nature and may be readily accomplished by an ordinary computer programmer. Accordingly, it does not appear necessary to recite that computer code in this specification or to provide separate illustration.

As a further refinement an additional rudimentary program is included in the preferred embodiment, enhancing system reliability. Thus, to assure that system operation is not triggered by a spurious reading caused by an electronic "glitch" in the system, before the valves can be opened, multiple pressure readings are taken consecutively, at least three times, and each reading must read a pressure below the critical pressure, whether S1, S2 or S3, before the reading is used as the individual sensor output. Such subsidiary program is akin to the keyboard key operation checking program typically found in computer systems to ensure that the user is actually depressing a key.

The foregoing preferred embodiment employed three redundant pressure sensors to monitor pressure at one axial location along conduit L2 spaced from the outlet end. In other embodiments two sensors may be located downstream at the location represented in the figure and a third pressure sensor located further downstream.

An additional modification is next considered. Reference is again made to the inter-valve region in FIG. 1 defined by the short conduit L3. Both the conduit L3 and the alternative direct connection between the outlet and inlet of the adjacent gas valves are fixed size volumes. For additional adjustability in a practical instrument, one may wish to be able to adjust the size of the inter-valve region. One way of accomplishing that is with the modification presented in FIG. 3, which illustrates in section view, a structure whose volume may be adjusted in size.

An opening may be made in the inter-valve conduit L3 and a vacuum tight metal bellows 31 sealed over that opening, thereby adding the internal volume of the bellows to the inter-valve region. The size of that bellows cavity may be adjusted by compressing the bellows. A metal bracket 33 also sealed to the conduit, positions a threaded opening containing a screw threaded member over the end of the bellows. By turning screw 32 in, the end of the screw compresses the bellows 31. Thus the size of the bellows may be adjusted, which adjusts the inter-valve region accordingly. The foregoing is but one possible adjustment structure. From the foregoing, other equivalent forms of accomplishing that adjustment should become apparent to those skilled in the art.

Figures 3, 4:
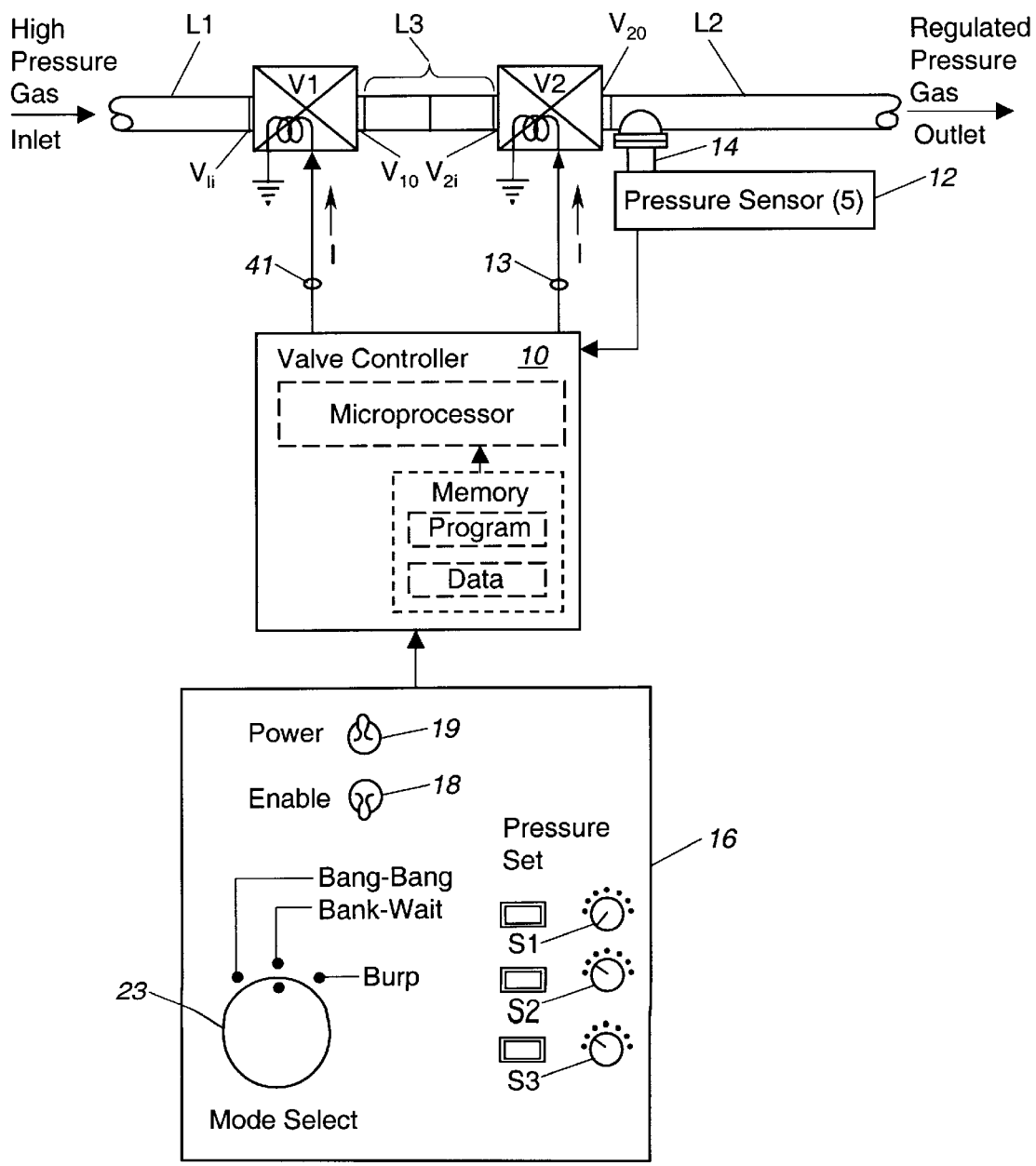
FIG. 3 illustrates a modification to an element of the system of FIG. 1.
FIG. 4 is a block diagram of a less preferred embodiment of the invention.

Reference is next made to FIG. 4, which is a block diagram of an elementary and less preferred pressure control system, earlier briefly referenced. For convenience, the elements in this figure which are the same as in the embodiment of FIG. 1 are identified by the same reference number. Those elements which are the same in function as those elements in the prior embodiment, but which may differ therefrom slightly in detail, are identified by the same numeral primed. Further since the functions and description of those elements were previously presented, it is unnecessary to discuss them again.

As shown the control panel 16' for the valve controller 10, includes the power switch 19, enable switch 18 and pressure setting switches S1, S2 and S3, as in the prior embodiment. It also contains a mode selector switch 23. The mode selector switch permits the user to select one of the operating modes and the valve controller operates the valves V1 and V2 only in the selected mode.

When the selector switch is set to the bang-bang mode, the pressure setting set on switch S1 is enabled, while that set on S2 and S3 are discarded; when set to the bang-wait mode, the pressure setting on switch S2 is enabled, while those set on S1 and S3 are disregarded; and when set to the burp mode, then only the setting on S3 is used, S1 and S2 are discarded. This is conveniently accomplished by grounding out those selector switches S1–S3 that are not used, placing them thereby at zero pressure, when the mode selector switch is set to a particular mode.

The sequencing and/or operation of the valves that is run by valve controller 10 in each of the three modes is the same as that earlier herein described and need not be described. If not fresh in mind, the reader is invited to review those descriptions. Thus, in operation, with power switch 19 operated, power is supplied to the valve controller, which is in the idle condition. The mode desired is selected with the mode select switch and the pressure switch associated with that mode, S1, S2 or S3, is set to the desired pressure and enable switch 18 is activated by the user. When the pressure in conduit L2, at the outlet of valve V2, falls below the pressure set on the respective one of the pressure switches, associated with the selected mode, the desired mode is run. When the pressure at least attains that set pressure, the valves are deenergized. The valve controller then waits for the pressure at the outlet of valve V2 to again drop below the set pressure level and reinitiated the valve operations associated with the selected mode.

With an understanding of the foregoing, the skilled reader appreciates that the valve controller 10 in the embodiment of FIG. 4 can employ the same program illustrated in FIG. 2, earlier described. Through the mode selector switch, the pressures set on the discarded mode selector switches are input to the program as zero psi.

It is appreciated that the automatic and remote control can be added to the elemental embodiment for added sophistication. For greater sophistication, additional operating modes may be added and accessed by a mode selector switch, such as mode selector 23, containing a greater number of positions, until one obtains the same degree of sophistication and complexity found in the embodiment of FIG. 1. As example selection positions may be added to the foregoing that combine the run of all three modes in consecutive order to attain the desired output pressure; or any two of those three modes. In such alternative embodiment, one must set the respective pressure switches S1, S2 and S3 accordingly.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A gas pressure regulator for regulating gas pressure within a gas system supplied with gas from a pressurized gas supply, comprising:

first and second electromagnetic gas valves, each having a gas inlet and a gas outlet and each said first and second electromagnetic gas valves being operable, when energized, from a closed condition for preventing passage of gas to an open condition to permit passage of gas;

said gas inlet of said first electromagnetic gas valve for connection to a pressurized gas supply, and said gas outlet of said second electromagnetic gas valve for connection to a gas system;

said gas outlet of said first electromagnetic gas valve being connected to the gas inlet of said second electromagnetic gas valve to place said electromagnetic gas valves in series gas transmission relationship between said gas inlet of said first gas valve and said gas outlet of said second gas valve and to define therebetween a small inter-valve region for holding a limited quantity of gas when both said gas valves are in a closed condition;

electrical controller means for selectively energizing and de-energizing said first and second electromagnetic gas valves at least (1) simultaneously, whereby gas may pass between said gas inlet of said first electromagnetic gas valve through said gas outlet of said second electromagnetic gas valve, and (2) sequentially, whereby a limited amount of gas may pass from said gas inlet of said first electromagnetic gas valve into said inter-valve region to confine said limited amount of gas therein and then be subsequently released through said gas outlet of said second electromagnetic gas valve; and pressure sensor means for monitoring gas pressure at said outlet of said second electromagnetic gas valve and supplying indication of said gas pressure to said electrical controller means;

said controller being responsive to said outlet gas pressure being below a predetermined value for simultaneously energizing and deenergizing said first and second electromagnetic gas valves simultaneously and being responsive to said outlet gas pressure being above said predetermined value for energizing said first and second electromagnetic gas valves sequentially until a second greater predetermined gas pressure value is attained.

2. The invention as defined in claim 1, further comprising:

a conduit for receiving gas from said gas outlet of said second electromagnetic gas valve, wherein gas received in said conduit is representative of outlet gas pressure at said gas outlet of said second electromagnetic gas valve;

wherein said pressure sensor means monitors gas pressure in said conduit to provide outlet gas pressure information; and said pressure sensor means further comprising a plurality of individual pressure sensors.

3. The invention as defined in claim 2, wherein at least one of said plurality of pressure sensors monitors gas pressure in said conduit at a location along said conduit displaced from other pressure sensors of said plurality of pressure sensors.

4. The invention as defined in claim 3, wherein said electrical controller means further includes:

gas pressure information program means for receiving outlet gas pressure information from each of said pressure sensors and interpreting said information to provide interpreted gas pressure information;

first program means for energizing both said electromagnetic gas valves simultaneously to transmit gas from said gas inlet of said first electromagnetic gas valve through said gas outlet of said second electromagnetic gas valve, responsive to said interpreted gas pressure information indicating that outlet gas pressure is below a first prescribed level, for de-energizing both said gas valves to prevent further transmission of said gas, responsive to said interpreted gas pressure information indicating that outlet gas pressure has attained said first predetermined pressure value;

second program means for momentarily energizing and deenergizing said first and second electromagnetic gas valves simultaneously to transmit a limited quantity of gas from said inlet of said first electromagnetic gas valve through said outlet of said second electromagnetic gas valve, responsive to said interpreted gas pressure information indicating that outlet gas pressure is below a second prescribed level, whereby outlet gas pressure increases, and then, with both said valves deenergized, rechecking said interpreted gas pressure information, and for again momentarily energizing and deenergizing said first and second electromagnetic gas valves simultaneously to transmit an additional limited quantity of gas from said inlet of said first gas valve through and outlet of said second gas valves, responsive to said interpreted gas pressure information indicating that outlet gas pressure remains below said second prescribed level, whereby outlet gas pressure increases further, and then rechecking said interpreted gas pressure information.

5. The invention as defined in claim 4, wherein said controller further includes:

third program means for momentarily energizing and deenergizing said first valve and then said second gas valve in sequence order to admit a small quantity of gas from said inlet of said first valve into said inter-valve region and then transmit said small quantity of gas from said inter-valve region through said outlet of said second gas valve, responsive to said interpreted gas pressure information indicating that outlet gas pressure is below a third prescribed level, and rechecking said interpreted gas pressure information, and then, with both said gas valves deenergized, rechecking said interpreted gas pressure information, and for again momentarily energizing and deenergizing said first gas valve and then said second gas valve in sequence order to admit an additional small quantity of gas from said inlet of said first gas valve into said inter-valve region and then transmit said small quantity of gas from said inter-valve region through said outlet of said second gas valve, responsive to said interpreted gas pressure information indicating that outlet gas pressure is below said third prescribed level, whereby outlet gas pressure increases further, responsive to said interpreted gas pressure information indicating that outlet gas pressure remains below said third prescribed level, and then rechecking said interpreted gas pressure information again.

6. The invention as defined in claim 1, wherein said electrical controller means further includes:

gas pressure information means for providing outlet gas pressure information, responsive to said pressure sensor means; and first program means for energizing both said electromagnetic gas valves simultaneously to transmit gas from an inlet of said first electromagnetic gas valve through an outlet of said second electromagnetic gas valve, responsive to said gas pressure information indicating that outlet gas pressure is below a first prescribed level, for de-energizing both electromagnetic said gas valves to prevent further transmission of said gas, responsive to said gas pressure information indicating that outlet gas pressure has attained said first predetermined pressure value;

second program means for momentarily energizing and deenergizing said first and second electromagnetic gas valves simultaneously to transmit a limited quantity of gas from said inlet of said first electromagnetic gas valve through and outlet of said second electromagnetic gas valve, responsive to said gas pressure information indicating that outlet gas pressure is below a second prescribed level, whereby outlet gas pressure increases, and then, with both said electromagnetic gas valves deenergized, rechecking said gas pressure information, and for again momentarily energizing and deenergizing said first and second electromagnetic gas valves simultaneously to transmit an additional limited quantity of gas from said inlet of said first electromagnetic gas valve through and outlet of said second electromagnetic gas valve, whereby outlet gas pressure increases further, responsive to said gas pressure information indicating that outlet gas pressure remains below said second prescribed level, and then rechecking said gas pressure information again.

7. The invention as defined in claim 6, wherein said controller further includes:

third program means for momentarily energizing and deenergizing said first valve and then said second gas valve in sequence order to admit a small quantity of gas from said inlet of said first valve into said inter-valve region and then transmit said small quantity of gas from said inter-valve region through said outlet of said second gas valve, responsive to said gas pressure information indicating that outlet gas pressure is below a third prescribed level, and rechecking said gas pressure information, and then, with both said gas valves deenergized, rechecking said gas pressure information, and for again momentarily energizing and deenergizing said first gas valve and then said second gas valve in sequence order to admit an additional small quantity of gas from said inlet of said first gas valve into said inter-valve region and then transmit said small quantity of gas from said inter-valve region through said outlet of said second gas valve, responsive to said gas pressure information indicating that outlet gas pressure is below said third prescribed level, whereby outlet gas pressure increases further, responsive to said gas pressure information indicating that outlet gas pressure remains below said third prescribed level, and then rechecking said gas pressure information again.

8. The invention as defined in claim 7, wherein said electrical controller means further comprises:
   microprocessor means, including a stored program;
   first and second outputs coupled, respectively, to said first and second electromagnetic gas valves;
   enable input means for receiving an input for enabling said microprocessor to run said program;
   pressure input means, said pressure input means being coupled to said output of said pressure sensor means;
   pressure setting input means for receiving a plurality of individual pressure settings.

9. The invention as defined in claim 8, wherein said plurality of individual pressure settings comprises three pressure settings, S1, S2 and S3.

10. The invention as defined in claim 9, wherein said stored program includes: means for
   retrieving said pressure settings S1, S2 and S3;
   obtaining said gas outlet pressure supplied by said pressure sensor;
   comparing said gas outlet pressure with said pressure setting S1 and, when said gas outlet pressure is found to be less than S1, energizing both said gas valves, whereby gas pressure at said outlet increases, and obtaining said gas outlet pressure anew; and, if said gas outlet pressure is found equal to or greater than S1, deenergizing both said gas valves, if said gas valves are then energized, to prevent further increase in outlet gas pressure; and
   comparing said gas outlet pressure with said pressure setting S2 and, when said gas outlet pressure is found to be less than S2, energizing both said gas valves for an interval, then de-energizing both said gas valves, whereby gas pressure at said outlet increases incrementally, and thereafter obtaining said gas outlet pressure anew and again comparing said gas outlet pressure with said pressure setting for S2 and, should said gas outlet pressure again be found to be less than S2, again energizing both said gas valves for an interval and again obtaining said gas outlet pressure, and repeating, and, if said gas outlet pressure is found equal to or greater than S2, leaving both said gas valves deenergized; and
   comparing said gas outlet pressure with said pressure setting S3 and, if found to be less than S3, then energizing said first electromagnetically operated gas valve for an interval and then de-energizing same and then energizing said second electromagnetically operated gas valve for an interval and then de-energizing same, whereby gas pressure at said outlet changes; and then re-obtaining said gas outlet pressure and repeating the foregoing, and, if said gas outlet pressure is found to be equal to or greater than S3, then leaving said gas valves deenergized.

11. Gas pressure regulating apparatus for regulating gas pressure within a gas system supplied with gas from a pressurized gas supply, comprising:
   first and second electromagnetically operated gas valves, having a gas inlet and a gas outlet, each said electromagnetically operated gas valves being operable from a closed position for preventing passage of gas to an open condition, when energized, to permit passage of gas;
   said gas inlet of said first electromagnetically operated gas valve for connection to a pressurized gas supply, and said gas outlet of said second electromagnetically operated gas valve for connection to a gas system;
   said gas outlet of said first electromagnetically operated gas valve being connected to the gas inlet of said second electromagnetically operated gas valve to place said electromagnetically operated gas valves in series gas transmission relationship and define an intermediate gas reservoir for holding a limited quantity of gas when both said gas valves are in said closed condition;
   electrical controller means for selectively energizing said first and second electromagnetically operated gas valves at least (1) simultaneously, whereby gas may pass between said inlet of said first electromagnetically operated gas valve through said outlet of said second electromagnetically operated gas valve and (2) sequentially, whereby a limited amount of gas may pass from said inlet of said first electromagnetically operated gas valve to said intermediate reservoir for temporary confinement therein and be released subsequently from said outlet of said second electromagnetically operated gas valve;
   pressure sensor means coupled to said gas outlet of said second valve for monitoring pressure at said gas outlet and supplying an output indicative of said monitored pressure;
   said electrical controller means further including:
      input means for receiving said pressure sensor means output;
      means for deenergizing said first and second electromagnetically operated valves, responsive to said pressure sensor means output attaining a first predetermined value when said first and second electromagnetically operated gas valves are being energized simultaneously; and
      means for preventing sequential energization and deenergization of said first and second electromagnetically operated gas valves, responsive to said pressure sensor means output attaining a second predetermined value when said gas valves are being sequentially energized.

12. A gas pressure regulator for regulating gas pressure within a gas system supplied with gas from a pressurized gas supply, comprising in combination:
   first and second electromagnetic gas valves, each having a gas inlet and a gas outlet and each said first and second electromagnetic gas valves being operable, when energized, from a closed condition for preventing passage of gas to an open condition to permit passage of gas;
   said gas inlet of said first electromagnetic gas valve for connection to a pressurized gas supply, and said gas outlet of said second electromagnetic gas valve for connection to a gas system;
   said gas outlet of said first electromagnetic gas valve being connected to the gas inlet of said second electromagnetic gas valve to place said electromagnetic gas valves in series gas transmission relationship between said gas inlet of said first gas valve and said gas outlet of said second gas valve and to define there between a small inter-valve region for holding a limited quantity of gas when both said gas valves are in a closed condition;

pressure sensor means for monitoring gas pressure at said gas outlet of said second electromagnetic gas valve and providing a sensor output representative of said outlet gas pressure;

programmable electrical controller means coupled to said sensor output and to said first and second gas valves for selectively controlling energization and de-energization of said first and second electromagnetic gas valves responsive to said sensor output of said pressure sensor means;

said programmed electrical controller means being responsive to monitored gas pressure level for automatically selecting in dependence upon said monitored gas pressure level between energization and deenergization of said first and second electromagnetic gas valves in sequence and energization and deenergization of said first and second electromagnetic gas valves simultaneously.

13. The invention as defined in claim 12, wherein said programmable electrical controller means includes:

Burp program means for energizing and deenergizing each of said first and second gas valves in sequence repetitively for so long as said outlet gas pressure is below a specified value, whereby each sequential energization and deenergization of said first and second gas valves admits a limited quantity of gas at said outlet for raising said outlet gas pressure.

14. The invention as defined in claim 12, wherein said programmable electrical controller means includes:

Bang-Wait program means for repeatedly energizing and deenergizing each of said first and second gas valves simultaneously for a prescribed interval for so long as said outlet gas pressure is below a specified value, whereby each energization and deenergization of said first and second gas valves admits a limited quantity of gas at said outlet for raising said outlet gas pressure.

15. The invention as defined in claim 14, wherein said programmable electrical controller means includes:

Bang-Bang program means for energizing said first and second gas valves simultaneously for so long as said outlet gas pressure is below a specified value and deenergizing said gas valves when said outlet gas pressure attains said specified valve, whereby each energization of said first and second gas valves admits a quantity of gas at said outlet for raising said outlet gas pressure.

16. The invention as defined in claim 12, wherein said programmable electrical controller means includes:

Burp program means for energizing and deenergizing each of said first and second gas valves in sequence for so long as said outlet gas pressure is below a specified value, whereby each sequential energization and deenergization of said first and second gas valves admits a limited quantity of gas at said outlet for raising said outlet gas pressure;

Bang-Wait program means for repeatedly energizing and deenergizing each of said first and second gas valves simultaneously for a prescribed interval for so long as said outlet gas pressure is below a specified value, whereby each energization and deenergization of said first and second gas valves admits a limited quantity of gas at said outlet for raising said outlet gas pressure; and Bang-Bang program means for energizing said first and second gas valves simultaneously for so long as said outlet gas pressure is below a specified value and deenergizing said gas valves when said outlet gas pressure attains said specified valve, whereby each energization of said first and second gas valves admits a quantity of gas at said outlet for raising said outlet gas pressure.

17. The invention as defined in claim 16, wherein said programmable electrical controller means further includes:

selection means for individually selecting said specified value for each of said Burp program means, said Bang-Wait program means and said Bang-Bang program means.

18. The invention as defined in claim 17, wherein said selection means further comprises:

Burp program pressure selector means for selecting said specified value for said Burp program means;

Bang-Wait pressure selector means for selecting said specified value for said Bang-Wait program means; and Bang-Bang pressure selector means for selecting said specified value for said Bang-Bang program means.

19. A gas pressure regulator comprising in combination:

first and second electromagnetic gas valves, each having a gas inlet and a gas outlet and each said first and second electromagnetic gas valves being operable, when energized, from a closed condition to an open condition;

said gas outlet of said first electromagnetic gas valve being connected to the gas inlet of said second electromagnetic gas valve to place said electromagnetic gas valves in series gas transmission relationship between said gas inlet of said first gas valve and said gas outlet of said second gas valve and to define there between a small inter-valve region for holding a limited quantity of gas when both said gas valves are in a closed condition;

pressure sensor means for monitoring gas pressure at said gas outlet of said second electromagnetic gas valve and providing a sensor output representative of said outlet gas pressure; and programmable electrical controller means coupled to said sensor output and to said first and second gas valves for selectively controlling energization and de-energization of said first and second electromagnetic gas valves responsive to said sensor output of said pressure sensor means;

said programmable electrical controller means including:

Burp program means for energizing and deenergizing each of said first and second gas valves in sequence for so long as said outlet gas pressure is below a specified value, whereby each sequential energization and deenergization of said first and second gas valves admits a limited quantity of gas at said outlet for raising said outlet gas pressure;

Bang-Wait program means for repeatedly energizing and deenergizing each of said first and second gas valves simultaneously for a prescribed interval for so long as said outlet gas pressure is below a specified value, whereby each energization and deenergization of said first and second gas valves admits a limited quantity of gas at said outlet for raising said outlet gas pressure; and Bang-Bang program means for energizing said first and second gas valves simultaneously for so long as said outlet gas pressure is below a specified value and deenergizing said gas valves when said outlet gas pressure attains said specified valve, whereby each energization of said first and second gas valves admits a quantity of gas at said outlet for raising said outlet gas pressure;

said programmable electrical controller means further including:

selection means for individually selecting said specified value for each of said Burp program means, said Bang-Wait program means and said Bang-Bang program means:

said selection means comprising:

Burp program pressure selector means for selecting said specified value for said Burp program means;

Bang-Wait pressure selector means for selecting said specified value for said Bang-Wait program means; and Bang-Bang pressure selector means for selecting said specified value for said Bang-Bang program means; and wherein a specified value selected by said Bang-Bang pressure selector means comprises: P1;

wherein a specified value selected by said Bang-Wait pressure selector means comprises: P2;

wherein a specified value selected by said Burp program pressure selector means comprises: P3; and wherein P3 is greater than P2, which, in turn, is greater than P1.

20. The invention as defined in claim 12, wherein said programmable electrical controller means includes: a microprocessor and a semiconductor memory.

* * * * *